United States Patent Office.

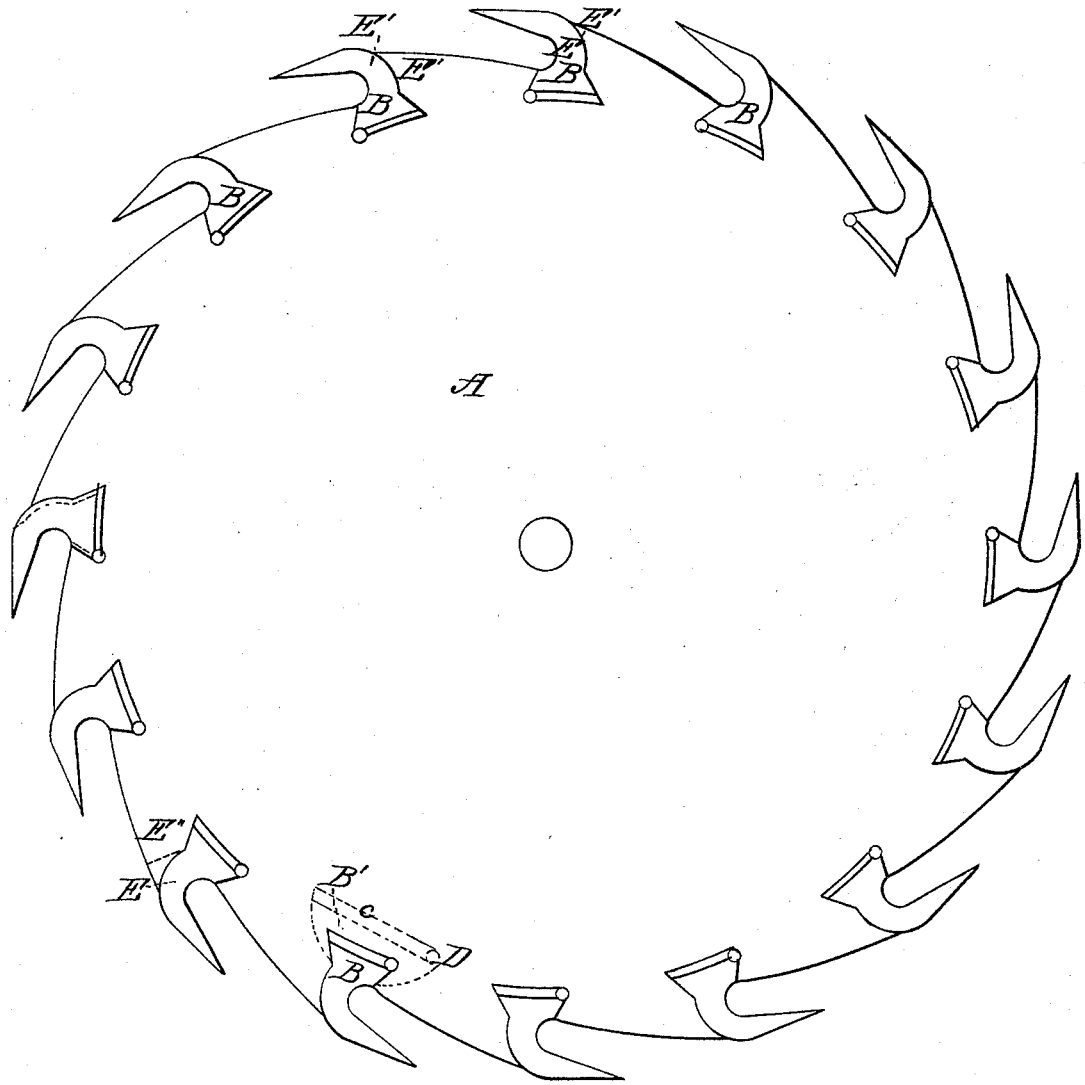

ALEXANDER C. MARTIN AND JOSEPH WOODROUGH, OF HAMILTON, OHIO.

*Letters Patent No. 61,014, dated January 8, 1867.*

IMPROVEMENT IN SAWS.

*The Schedule referred to in these Letters Patent and making part of the same.*

TO ALL WHOM IT MAY CONCERN:

Be it known that we, ALEXANDER C. MARTIN and JOSEPH WOODROUGH, of Hamilton, in Butler county, in the State of Ohio, have invented a new and useful Improvement in Saws; and we do hereby declare that the following is a full and exact description thereof, reference being had to the accompanying drawings, and to the letters of reference marked thereon.

The drawing represents a circular saw with our improvement attached.

Our invention consists in introducing a saw tooth into an opening in the plate of the saw larger than the base or shank of the tooth, and securing the tooth therein by adjusting it towards the periphery or edge of the saw, and inserting a separate plate or piece of metal in the opening at the base of the tooth-shank, as will be herein more fully described.

In the accompanying drawing, A denotes a circular saw plate; B is the removable saw tooth; C a plate of metal; and D is a pin inserted at the end of the plate C. The tooth-shank, plate C, and pin D, are of equal thickness with the saw plate A, and the angularly formed opening into which the tooth-shank is inserted is of a size and form corresponding with the space occupied by the shank, metal plate, and pin. The form of this opening in the periphery or edge of a saw plate may, however, be varied as indicated in dotted lines at B', as in that case the tooth would be inserted and secured in its proper place by moving, or adjusting it, from the direction of the centre towards the periphery or edge of the saw plate. The edges of the tooth-shank which rest against the edge of the saw plate, at the sides of the opening, are provided with a V-shaped groove to fit upon a corresponding V-shaped seat which is the edge of the plate; this, however, is no part of our present invention. The back of the tooth at E is curved outwardly and rests against the curved projecting portion of the saw-plate E'. This curved back of the tooth may be dispensed with, and it and the backing may be made plain as indicated in the dotted line E''. The object of either the curved or straight back and backing of the tooth is to receive the force or pressure when the saw is in use, and to relieve the seat at the base of the tooth-shank from undue pressure, as well as to avoid any tendency of the tooth being unseated when in operation. It will be observed that our improvement is equally well adapted to the reciprocating or straight saw as to the circular saw. The saw plate is formed with a series of curved or angular openings or depressions as represented, the width of which is less at the periphery than at any point towards its base, that is to say, the spaces or openings in which the teeth are inserted widen as they extend towards the centre of the saw, and the teeth-shanks being of a corresponding form (but of less depth) cannot be unseated by the centrifugal action of the saw when in use. The teeth-shanks being grooved as described to fit over the angular-shaped edges of the plate at the sides of the opening, it will be seen that the opening must be deeper than the tooth-shank from its curved portion to its base. The teeth being thus inserted, by moving them outward, will leave a space to be filled at their base by a strip of metal. The plate or strip C, and pin D, or either of them, will be sufficient to retain the teeth in place. When one tooth or set of teeth is worn out or broken others may be readily inserted in their place.

Having fully described the manner of constructing and using our improvements in saws, what we claim, and desire to secure by Letters Patent, is—

Inserting the saw tooth in its seat, by moving it towards the periphery or edge of the saw, and securing it in place by the means substantially as specified.

In testimony whereof we have hereunto set our hands this 29th August, 1866.

A. C. MARTIN,
JOSEPH WOODROUGH.

Witnesses:
H. P. K. PECK,
NELSON GATES.